INVENTORS
JAMES H. NANCARROW
GLEN H. HOLZHAUSEN
BY Fraser and Bogucki
ATTORNEYS

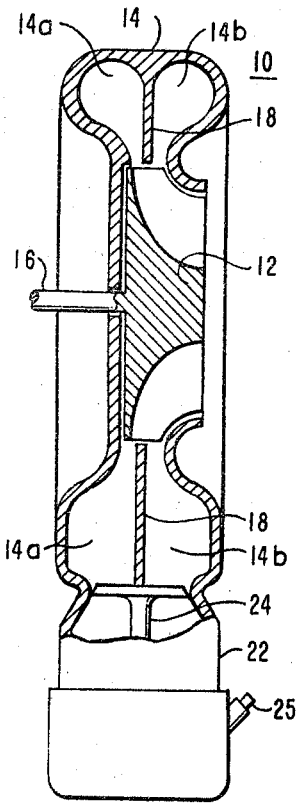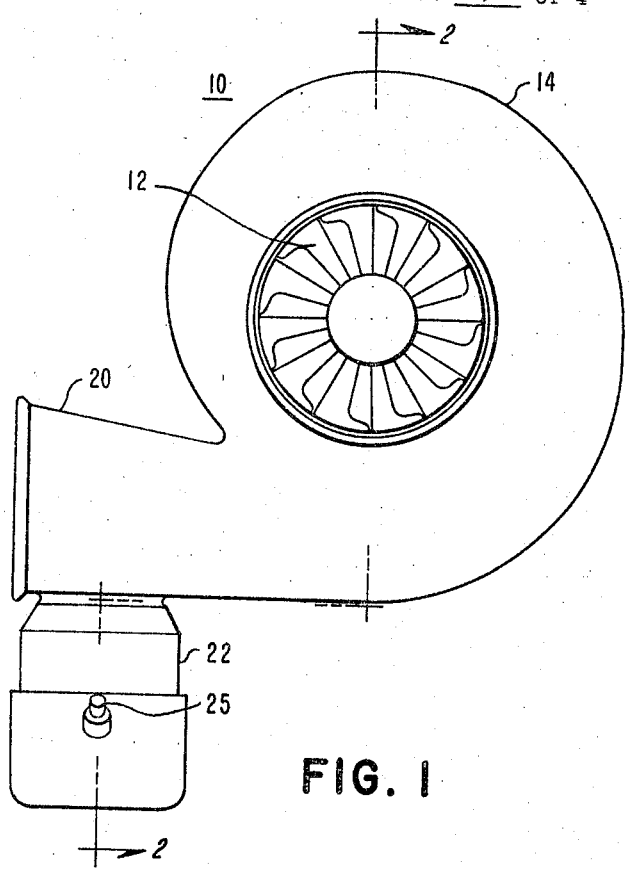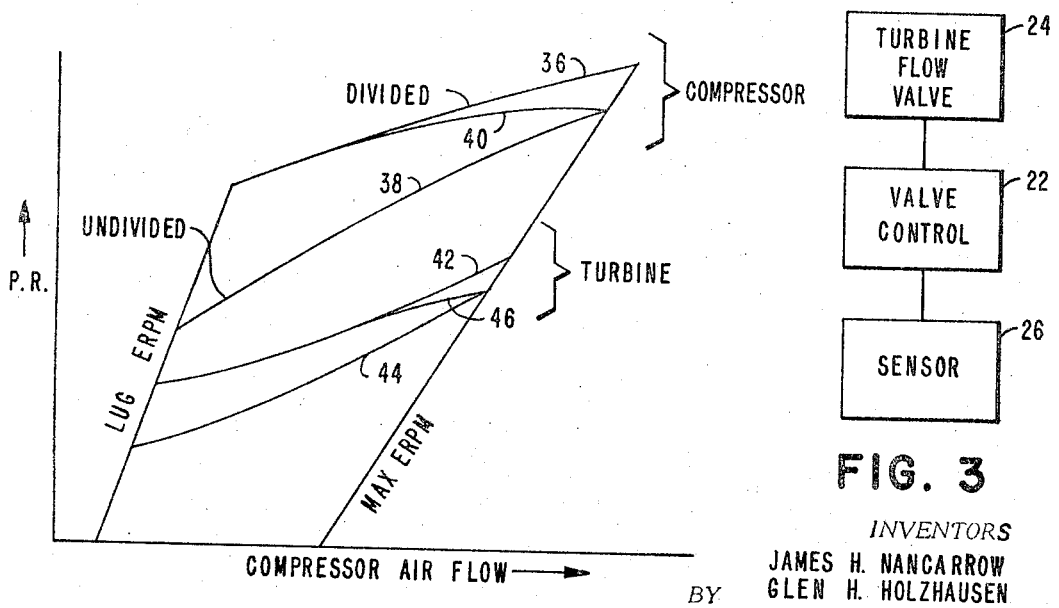

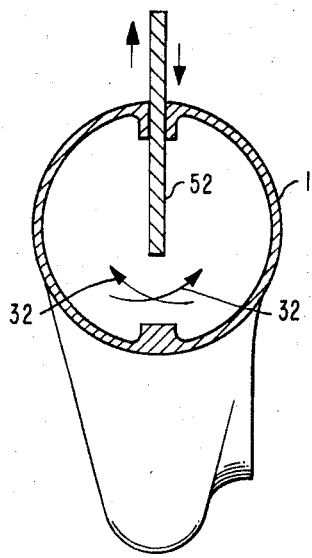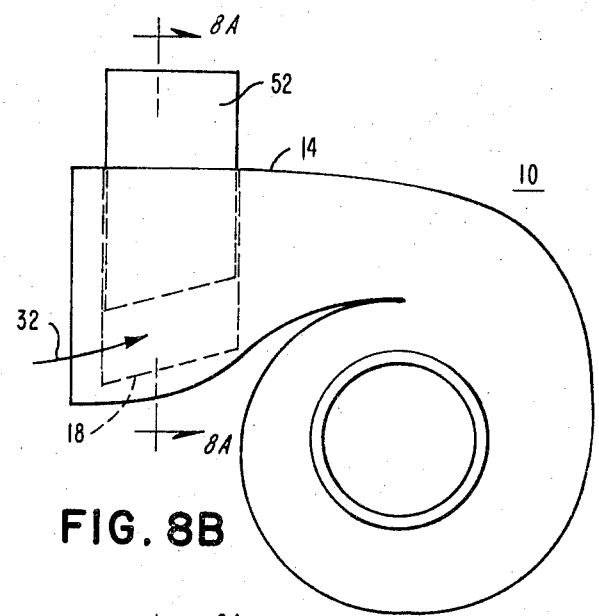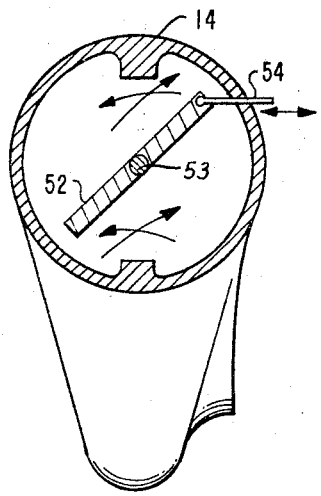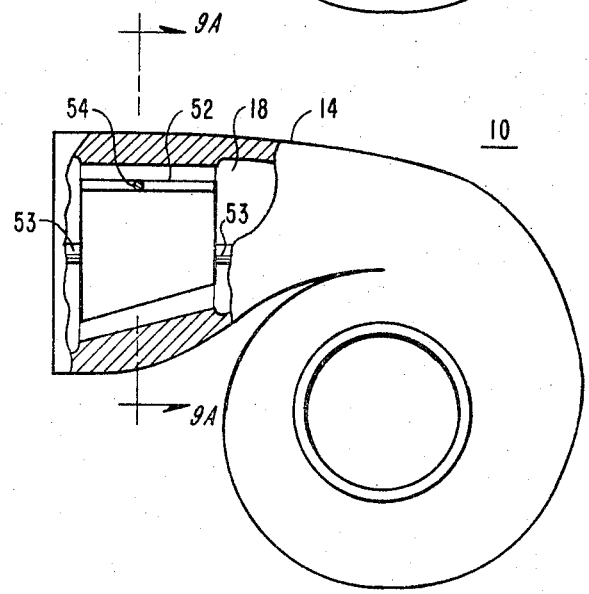

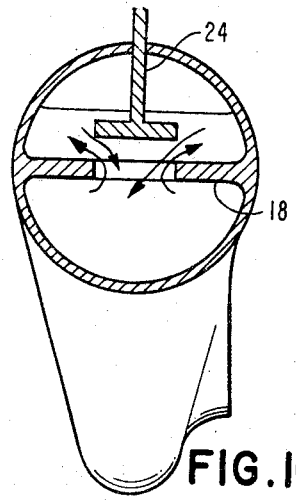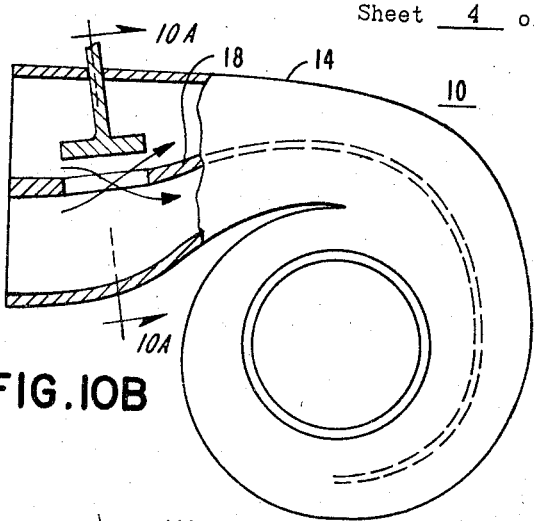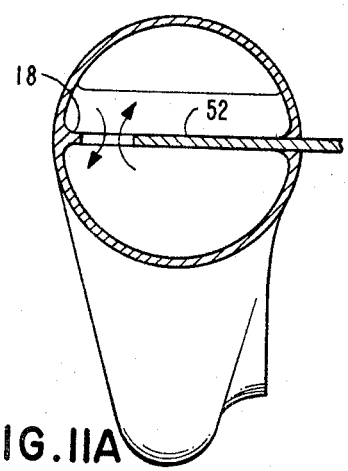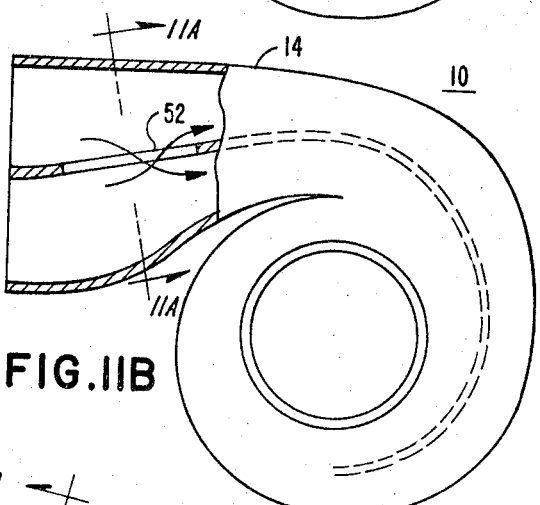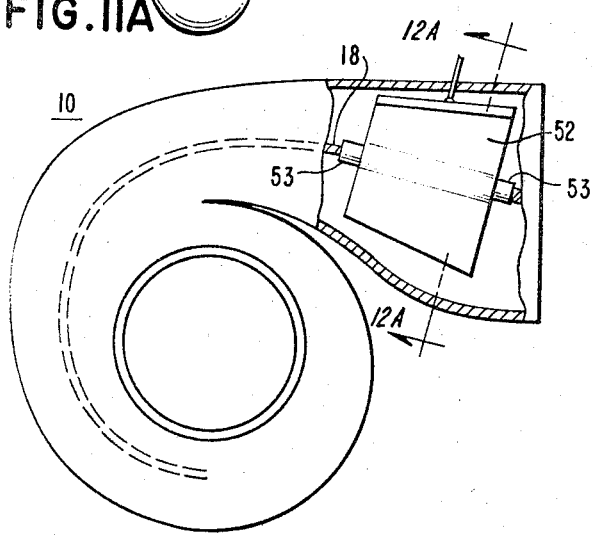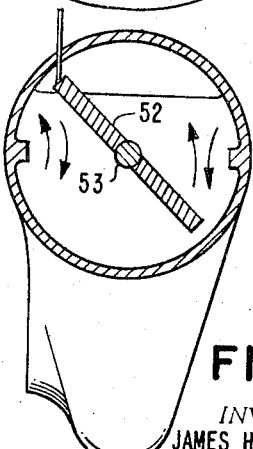

United States Patent Office 3,423,926
Patented Jan. 28, 1969

3,423,926
TURBOCHARGER CONTROL ARRANGEMENT
James H. Nancarrow, Torrance, and Glen H. Holzhausen, Redondo Beach, Calif., assignors to The Garrett Corporation, a corporation of California
Filed Aug. 31, 1966, Ser. No. 576,387
U.S. Cl. 60—13
Int. Cl. F02b 41/10; F01k 23/14
9 Claims

ABSTRACT OF THE DISCLOSURE

Turbocharger apparatus for a pulse exhaust system including a turbine having a divided housing with structure being provided for controlling the flow of engine exhaust gases in accordance with a selected parameter so as to provide a controlled transition between divided and undivided operation of the turbocharger.

---

This invention relates to turbomachinery control arrangements and more particularly to control arrangements for varying turbine flow characteristics of a turbine having a divided housing.

Turbocharger units, comprising a single stage blower and a gas turbine driven by engine exhaust gases, are generally used to provide engine intake air at increased pressure over a wide range of engine operating conditions. It is difficult to provide a turbocharger unit which is capable of satisfactory operation over the complete range of engine regimes. If the turbocharger is set to provide supercharged air adequate for low speed engine operation, there is a tendency for the turbocharger to overspeed when the engine is operated in the upper portion of its speed range. Even if the turbocharger is capable of withstanding the high speeds encountered, it tends to overboost the engine with sometimes catastrophic results. Conversely, if the turbocharger is set for supercharging at the upper limit of the engine speed range, it is unlikely to provide adequate supercharging in the low speed or "lug" range of the engine.

Various arrangements have been devised in the prior art in an attempt to meet this problem. One approach is the waste gate method which provides a controllable by-pass for exhaust gases when the engine is operating at high speed in order to maintain the maximum speed of the turbocharger within safe limits. Such an arrangement is, however, wasteful of efficiency in the operation of the resulting structure. Even when a corresponding arrangement is provided which does not waste exhaust gases past the turbine but rather diverts a portion thereof to a section of the turbine wheel which is utilized for developing power only in case of the turbine approaching maximum safe operating speeds (either from the standpoint of turbocharger speed limitation or engine overboost), such an arrangement is effective only in limiting the maximum speed of the turbine and does not have the desired effect of varying the operating characteristics of the turbocharger over the range of speeds below the maximum limit. Other arrangements have been developed to reduce the fluid flow by a throttling action, but this is undesirable in the case of an exhaust driven turbocharger, since it increases the back pressure of the associated engine and adversely affects the performance thereof. Still another approach is to control the direction and velocity of the exhaust gases as they are directed against the turbine wheel by vanes or the like which may be controlled to vary the angle of attack and velocity of the gases. Arrangements utilizing this approach necessarily require more complicated structures and therefore are more costly and less reliable.

Particular turbines have been devised for use with reciprocating engines utilizing structural configurations which provide more effective operation and increased efficiency. One such configuration utilizes a divided turbine housing which may be particularly effective when operated in conjunction with an engine having good pulse characteristics. With a divided housing, the flow from one or more cylinders is delivered to the turbine wheel without being allowed to mix or interact with the flow from the remaining cylinders. By contrast, with an undivided turbine housing, the flow of exhaust gases from all of the cylinders is allowed to mix upstream of the turbocharger, and different operating characteristics are obtained from an undivided turbine. The curve of pressure ratio versus compressor air flow for a divided turbine housing used in an engine with good pulse characteristics lies above the corresponding curve for an undivided turbine housing in the operating range between engine revolutions per minute (e.r.p.m.) in the lug condition and maximum e.r.p.m. Therefore, it is generally desirable to utilize a divided turbine in a turbocharger for such an engine in order to get the desired operation at the low speed end of the range. However, such a turbine provides more power than is needed in the middle and upper ranges of engien r.p.m.

It is therefore a general object of the present invention to provide an improved turbocharger arrangement.

It is a more specific object of the present invention to provide an arrangement for controllably varying the operating characteristics of a turbocharger utilizing a divided turbine housing.

It is a further object of the present invention to provide a turbocharger arrangement having improved operating characteristics over the entire operating range of an associated reciprocating engine.

In brief, arrangements in accordance with the present invention may utilize a turbocharger including a turbine having a divided housing with structure being provided for controllably interchanging and intermixing the pulses of exhaust gases in the two separate portions of the divided turbine housing. Such arrangements in effect serve to undivide the flow at high engine r.p.m. and permit each exhaust pulse to go into both halves of the turbine housing, thereby advantageously reducing the pressure ratio at the higher engine r.p.m. The resulting operating characteristics present the advantages of the higher pressure ratio of the divided turbine housing at lower engine r.p.m. while shifting over to the characteristic of the undivided turbine housing with the reduced pressure ratio in the higher engine speed ranges. Such arrangements give better engine lug characteristics than a "free floating" turbocharger and are more efficient than a waste gated turbocharger. By suitably controlling the amount of air which can cross over between the divided passages, the flow characteristics of the turbine can be varied between that of an undivided housing and that of a divided housing. In this manner, higher density air can be delivered to the engine at low engine speed without overboosting at high engine speed. In accordance with an aspect of the invention, a controller is provided which may sense either turbine inlet pressure or compressor outlet pressure to initiate the opening of a valve in the turbine housing divider at a selected pressure and to complete the undividing and mixing of the exhaust pulses at a selected point near the upper speed range of the engine.

In one particular arrangement in accordance with the invention, an arrangement is provided for controllably varying the division of flow to each half of a meridionally divided turbine housing. In meridionally divided turbine housings, each division has 360° admission to the turbine wheel tip circumference and partial admission to the wheel tip width. In another particular arrangement in accordance with the invention a structure is provided for controllably varying the division of flow between the separate portions of circumferentially divided housings. In circumferentially divided housings, each division has full admission to the turbine wheel tip width and partial admission of the wheel tip circumference. It will be understood, of course, that the principles of the invention may be employed to controllably vary the degree of division of flow for turbine housings with more than two divisions or with combinations of meridional and circumferential divisions as well without departing from the scope of the invention. Moreover, the principles of the invention may be practiced in combination with waste gating mechanisms, and one particular arrangement in accordance with the invention is shown and described herein which provides for sequential control of undividing the flow to a divided turbine housing followed by waste gating after full undivided flow is attained.

A better understanding of the present invention may be had from a consideration of the following detailed description taken in conjunction with the following drawings, in which:

FIG. 1 is an end view of a particular arrangement in accordance with the invention;

FIG. 2 is a partial sectional view of the arrangement of FIG. 1 taken along the lines 2—2;

FIG. 3 is a block diagram demonstrating the operation of a control system in accordance with the invention utilized in conjunction with the structural arrangement of FIGS. 1 and 2;

FIG. 6 is a graph illustrating the effect upon turbine flow parameters resulting from the use of the present invention;

FIGS. 8A and 8B represent still another arrangement in accordance with the invention;

FIGS. 9A and 9B represent still another arrangement in accordance with the invention;

FIGS. 10A and 10B represent another arrangement in accordance with the invention;

FIGS. 11A and 11B represents yet another arrangement in accordance with the invention; and FIGS. 12A and 12B represent still another alternative arrangement in accordance with the invention.

Figure 4A:
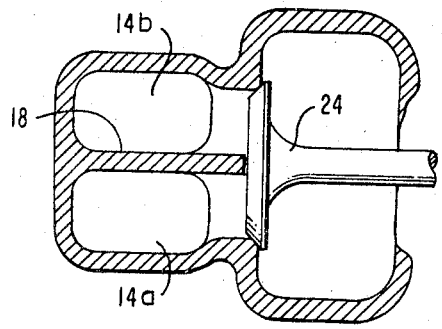
FIGS. 4A and 4B are schematic representations of a portion of the arrangement of FIGS. 1 and 2.

In the particular arrangement in accordance with the invention depicted in FIGS. 1 and 2, the turbine 10 is shown having a wheel 12 in a housing 14. The wheel is shown mounted on a shaft 16 which may be extended to a compressor (not shown) of a complete turbocharger unit. It will be noted that the turbine housing 14 is divided into two portions 14a and 14b by a vane 18. At the inlet 20 of the turbine 10 there is affixed a housing 22 which encloses a valve 24 that is movable against or away from the vane 18 and main housing 14. The lower portion of the housing 22 contains an operating mechanism coupled to the valve 24 for controlling the position thereof. The details of the valve operating mechanism are not shown, since it may comprise any of a number of actuators known in the art. For example, it may be in the form of a spring-loaded piston or diaphragm to which the valve 24 may be attached and which is movable against a spring under pressure of a fluid admitted through the opening 25 to which a tube may be coupled.

FIG. 3 illustrates in block diagram form the manner in which the turbine flow valve 24 may be controlled. As shown in FIG. 3, the flow valve 24 is coupled to the valve control mechanism 22 which in turn is responsive to the pressure at a selected point in the system as monitored by a sensor 26. For example, the sensor 26 may be positioned to sense turbine inlet pressure and to provide the desired control of the turbine flow valve 24 in response to particular variations thereof. Alternatively, it may be positioned to sense compressor outlet pressure and to control the position of the turbine flow valve 24 in accordance with that pressure. It may, if desired, be positioned to sense differential pressure across the turbine or compressor or any other parameter which may be related to the result desired.

Figure 4B:
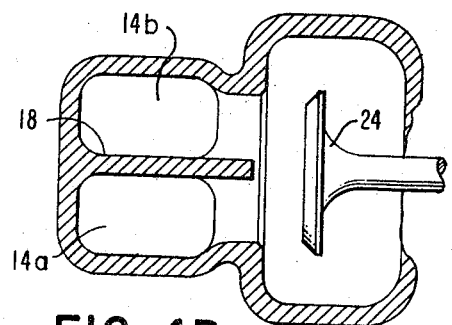

FIGS. 4A and 4B represent portions of the arrangement of FIGS. 1 and 2 with the valve 24 in the closed and open positions respectively. When the valve 24 is in the closed position, as shown in FIG. 4A, the divided housing passages 14a and 14b are maintained separate from one another so that the turbine continues to provide divided operation. However, with the valve 24 in the open position of FIG. 4B, a flow communication passage is provided between the divided portions 14a and 14b of the housing with the result that mixing of the flow in the separate portions is permitted so that undivided operation is achieved. The valve 24 may be controlled at any position between fully closed and fully open in order to provide a gradual transition from one type of operation to the other, or it may be maintained at any intermediate position in order to provide an operating characteristic corresponding to partially divided flow.

Figure 5A:
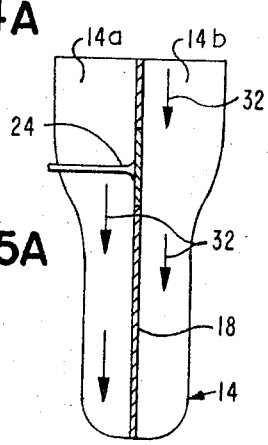
FIGS. 5A and 5B are schematic representations of a portion of the arrangement of FIGS. 1 and 2.
Figure 5B:
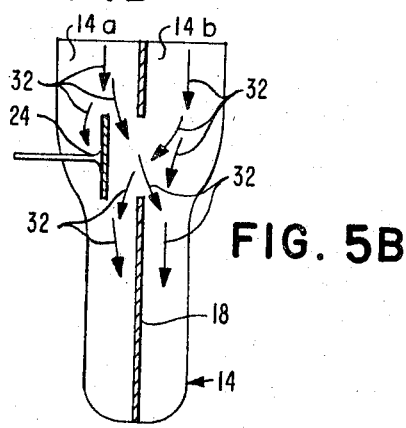

FIGS. 5A and 5B represent in schematic form the effect upon the fluid flow of the operation of the invention. In FIG. 5A, a valve 24 is shown in closed position in a divider 18 separating individual portions 14a and 14b of a divided housing 14. Fluid flow is represented by the arrows 32 which are drawn displaced along the extent of the housing 14 to illustrate pulses of the fluid in the passages. In FIG. 5B, however, the valve 24 is shown open so that the fluid in the respective passages 14a and 14b as represented by the arrows 32 is permitted to cross from one passage to the other with a mixture of the fluid pulses in the respective passages so that undivided flow results.

The effect of operation in the various regimes, divided, undivided and partially divided, is shown in the graph of FIG. 6. This graph represents a plot of pressure ratio versus compressor air flow and shows curves for both a compressor and a turbine of a turbocharger operating in conjunction with a reciprocating engine between engine speed ranges from lug speed to maximum engine r.p.m. The curve 36 and the curve 38 represent the plot for a particular compressor driven by a turbine in the divided and undivided modes respectively. The curve 40 represents the pressure ratio for the same compressor when the associated turbine is controlled in accordance with the present invention. It will be noted that the curve 40 follows the curve 36 for approximately the first half of the engine speed range. During this portion of the range, the turbine is operated most advantageously in the divided mode of operation; therefore, the valve 24 of FIG. 2 is arranged to be maintained in the closed position so that full divided operation is achieved. The flow valve control mechanism is arranged to cause the valve to begin opening at engine r.p.m. at approximately mid-range (or, in effect, at a predetermined pressure ratio) so that as engine speed increases, a gradual transition from divided to undivided operation occurs until at maximum engine r.p.m. the valve is fully open and the turbine is operating in the undivided mode. It will be noted that the resultant compressor characteristic curve 40 is more nearly horizontal than either of the curves 36 or 38, thus indicating a more nearly constant pressure ratio over the operating range of the engine. Similar curves 42, 44 and 46 are shown for the turbine portion of the turbocharger, and the effect can be seen as the valve 24 is progressively opened in the upper speed range of the associated engine. In both cases, the advantage is apparent that the pressure ratio is reduced from that point which it would reach for maximum engine r.p.m. in the divided turbine mode. This advantage is achieved without any reduction in the pressure ratio which is available at the lower end of the engine speed range. Put another way, the invention provides an improved acceleration characteristic for the engine by permitting higher pressure ratios at light loads to provide more boost for acceleration without overboosting at higher engine loads. The improvement afforded by this operation is achieved without the loss of efficiency or the requirement for complicated mechanisms which may result from the use of waste gating arrangements or systems for varying the natural configuration of the turbine vanes or nozzles.

Figure 7A:
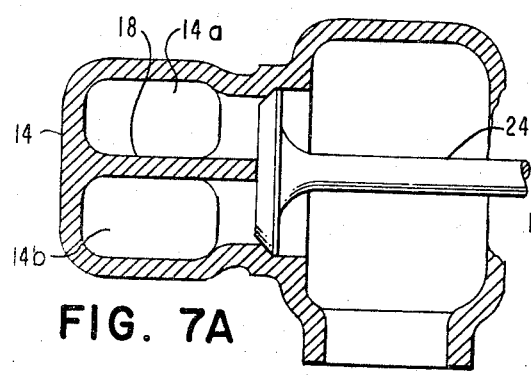
FIGS. 7A, 7B and 7C are schematic representations of an alternative arrangement of a portion of the arrangement shown in FIGS. 1 and 2.
Figure 7B:
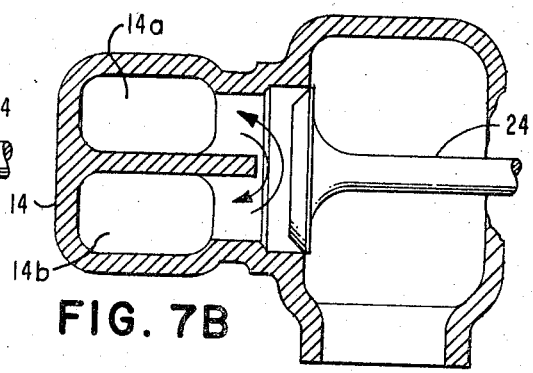
Figure 7C:
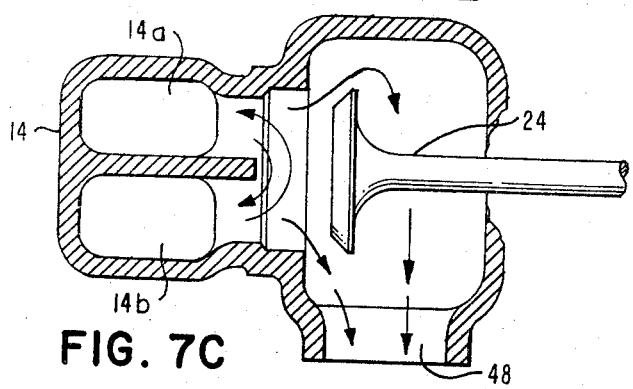

Despite the advantages provided by present arrangements of the invention as described hereinabove, there may be certain conditions under which waste gating is desirable in conjunction with a change of operating mode from the divided to undivided operation. FIGS. 7A, 7B and 7C, representing the valving and control portion of FIGS. 1 and 2, illustrate such an arrangement. In FIGS. 7A and 7B, a valve 24 is shown in positions corresponding respectively to FIGS. 4A and 4B. That is, in FIG. 7A the valve 24 is shown at closed position against the divider 18 so that the housing 14 is sealed in order to maintain divided flow. In FIG. 7B, the valve 24 is shown opened sufficiently to permit full flow of fluid between divided passages 14a and 14b but without permittin gthe escape of any of the fluid from the housing 14. In FIG. 7C, however, the valve 24 is shown opened to a still further extent to the point where fluid within the housing 14 is permitted not only to flow from one of the divided passages to the other but also to escape through an opening 48 which serves as a waste gate to bypass that fluid from the associated turbine. The arrangement depicted in FIGS. 7A, 7B and 7C provides for a combination of controlled transition between divided and undivided flow and also the control of waste gating the fluid in order to permit a bypass of the turbine.

FIGS. 8A, 8B, 9A and 9B illustrate particular arrangements in accordance with the invention for varying the division of flow of the driving fluid to the respective portions of meridionally divided turbine housings. In FIGS. 8A and 8B, wherein FIG. 8A is a sectional view taken along the line 8A—8A of FIG. 8B, the turbine fluid flow control valve is shown as a vane 52 which is aligned with the divider 18 of the divided turbine housing 14. The vane 52 is arranged to be moved inward or outward in the plane of the divider to provide the desired control of the flow of fluid through the divided housing. With the vane 52 in the opened position, as shown in FIGS. 8A and 8B, the fluid pulses are free to mix from one side to the other of the divided housing 14, as indicated by the arrows 32, so that undivided operation is achieved. However, with the vane 52 moved inward to completely fill the opening of the divider 18, flow of fluid from one portion to the other of the divided housing 14 is prevented so that divided operation is achieved.

In FIGS. 9A and 9B which also depict a meridionally divided turbine housing (FIG. 9A being a section taken along the line 9A—9A of FIG. 9B), the vane 52 is shown pivoted about a pin 53 which serves to position the vane 52 in the divider 18. A control linkage 54 is shown coupled to the vane 52 and controls the angle hereof so that the flow of the driving fluid is also controlled. With the vane 52 open in the position shown, fluid from the separate portions of the divided housing 14 is free to pass from one side to the other, thereby providing for undivided operation of the turbine 10. The vane 52 is closed in the vertical position, with the linkage 54 moved to the left of the position shown, and, when closed, maintains full divided operation of the turbine 10.

FIGS. 10A, 10B, 11A, 11B, 12A and 12B show various configurations in accordance with the invention for controlling the transition between divided and undivided operation in a circumferentially divided housing. In FIGS. 10A and 10B, of which FIG. 10A is a sectional view taken along a line 10A—10A, a valve 24 is shown disposed in position to close an aperture in the divider 18 of the turbine housing 14. FIGS. 11A and 11B, a vane 52 is provided which is movable in a plane coincident with the plane of the divider 18 at that point in the housing 14. Thus, the vane 52 may be moved inward or outward to close or open the aperture in the divider 18 and thereby control the transition between divided and undivided operation of the turbine 10. FIGS. 12A and 12B show a similar vane 52 which is pivoted by a pin 53 mounted in the divider 18. In this particular arrangement, the vane 52 is contolled in angular position by means of a suitable linkage (not shown) to vary the operation of the turbine 10 from fully divided (vane 52 closed) to undivided operation (vane 52 open).

The various particular arrangements which have been shown and described hereinabove are intended merely to provide a number of examples of mechanisms which may be employed for this purpose. It is not contemplated that these examples exhaust the ways in which the principles of the invention may be practiced, and doubtless other examples will occur to those skilled in the art.

Although there have been described above particular turbocharger control arrangements in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. In a turbocharger for use in conjunction with a reciprocating engine providing a plurality of sources of drive fluid having differing pressure-time characteristics, a turbine, means for maintaining divided flows of drive fluid from said sources to said turbine in the lower speed range of said engine, means permitting intermixing of said flows in a higher engine speed range, and means for controlling the degree of mixing of the drive fluid directed to said turbine for controlling the transition between divided and undivided operation.

2. In a turbocharger for use in conjunction with a reciprocating engine providing a plurality of sources of drive fluid having differing pressure-time characteristics, a turbine, means for maintaining divided flows of drive fluid from said sources to said turbine in the lower speed range of said engine, means permitting intermixing of said flows in a higher engine speed range, and means for controlling the degree of mixing of the drive fluid directed to said turbine for maintaining a substantially constant output pressure from the turbocharger over the upper speed range of said engine.

3. A turbine operated by driving fluid from the exhaust of an associated reciprocating engine providing a plurality of sources of driving fluid having differing pressure-time characteristics and having a divided housing in which a divider separates said housing into two distinct portions, at least a portion of said divider being operable to controllably vary the extent of an opening in said divider to permit the selective intermixture of fluid flowing in the respective portions.

4. A turbine control arrangement for controllably varying the extent by which the driving fluid from a plurality of sources of driving fluid having differing pressure-time characteristics is intermixed in a divided turbine comprising a turbine housing having a divider separating said housing into at least two passages, each passage receiving driving fluid from only a portion of said sources, said divider having an aperture therein upstream of said turbine, means for controlling the size of said aperture between fully opened and fully closed, and means for sensing a particular operating condition responsive to the speed of an associated engine for controlling said aperture controlling means in accordance therewith.

5. A turbine suitable for being driven in either divided or undivided operation by exhaust gases from an associated reciprocating engine providing a plurality of sources of drive fluid having differing pressure-time characteristics, said turbine comprising a housing having a divider separating said housing into at least two distinct passages, means connected to said housing for providing communication for said driving fluid between the distinct passages of said housing, said last mentioned means including a passageway directed to bypass fluid from said housing, valving means positioned to control the extent of the opening of said communicating passage so as to control the extent by which the driving fluid in the respective passages is maintained divided, intermixed or bypassed from the turbine housing, and means for controlling the position of said valving means whereby the turbine may be selectively operated in either the divided or undivided mode or whereby waste gating is provided.

6. A turbine arranged to be driven by exhaust gases having distinct and different pressure-time characteristics from an associated reciprocating engine, the turbine having a divided housing in which an apertured divider separates said housing into two distinct portions, and a valve adjacent an aperture in said divider to control the intermixture of gases between the respective portions of the housing.

7. An arrangement in accordance with claim 6 wherein said valve is aligned substantially perpendicular to the divider of said housing and is arranged to abut against said divider when in a closed position.

8. An arrangement in accordance with claim 6 wherein said valve comprises a vane aligned with the divider of said housing and arranged to be movable substantially in the plane of the divider to vary the extent of opening in said divider.

9. Apparatus in accordance with claim 6 wherein said valve comprises a vane pivotally mounted in said divider and arranged to rotate between positions respectively opening and closing the aperture in said divider.

References Cited

UNITED STATES PATENTS

| | | | |
|---|---|---|---|
| 2,247,151 | 6/1941 | Clarke | 60—13 |
| 2,838,907 | 6/1958 | Cowland | 60—13 |
| 3,270,495 | 9/1966 | Connor | 60—13 |

MARTIN P. SCHWADRON, *Primary Examiner.*

DOUGLAS HART, *Assistant Examiner.*

U.S. Cl. X.R.

253—39